(12) United States Patent
Basulto et al.

(10) Patent No.: US 9,609,186 B2
(45) Date of Patent: *Mar. 28, 2017

(54) RECEPTACLE FOR AN IMAGE CAPTURE COMPUTING DEVICE AND A STABILIZATION DEVICE

(71) Applicant: iOgrapher, LLC, San Gabriel, CA (US)

(72) Inventors: David Basulto, San Gabriel, CA (US); Jason Ivey, Irvine, CA (US)

(73) Assignee: iOgrapher, LLC, San Gabriel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/682,911

(22) Filed: Apr. 9, 2015

(65) Prior Publication Data

US 2015/0215511 A1 Jul. 30, 2015

Related U.S. Application Data

(63) Continuation-in-part of application No. 13/895,349, filed on May 15, 2013.

(60) Provisional application No. 61/768,751, filed on Feb. 25, 2013.

(51) Int. Cl.
*H04N 5/225* (2006.01)

(52) U.S. Cl.
CPC ......... *H04N 5/2252* (2013.01); *H04N 5/2256* (2013.01)

(58) Field of Classification Search
CPC ................................................ A45C 2013/025
USPC .................................................. 348/373–375
See application file for complete search history.

(56) References Cited

U.S. PATENT DOCUMENTS

| 2011/0069947 A1* | 3/2011 | Orf ...................... F16M 11/04 396/419 |
| 2012/0275025 A1* | 11/2012 | Parrill .......................... 359/511 |
| 2012/0300394 A1* | 11/2012 | Norfolk ................ G06F 1/1628 361/679.55 |
| 2013/0005401 A1* | 1/2013 | Rosenhan et al. ............ 455/557 |

\* cited by examiner

*Primary Examiner* — Sinh Tran
*Assistant Examiner* — Selam Gebriel
(74) *Attorney, Agent, or Firm* — Patent Ingenuity, P.C.; Samuel K. Simpson (57) ABSTRACT

An apparatus comprises a receptacle configured to receive a mobile computing device that has an integrated image capture component. Further, the apparatus comprises a first handle having a first handle top portion that is operably connected to the receptacle and a first handle bottom portion that is operably connected to the receptacle. In addition, the apparatus comprises a second handle having a second handle top portion that is operably connected to the receptacle and a second handle bottom portion that is operably connected to the receptacle. The apparatus also comprises a tripod receiver that is operably attached to the first handle. The tripod receiver receives a tripod connector to connect a tripod to the first handle.

11 Claims, 10 Drawing Sheets

RECEPTACLE FOR AN IMAGE CAPTURE COMPUTING DEVICE AND A STABILIZATION DEVICE

RELATED APPLICATIONS

This patent application is a Continuation-In-Part application of U.S. patent application Ser. No. 13/895,349, filed on May 15, 2013, entitled RECEPTACLE FOR AN IMAGE CAPTURE COMPUTING DEVICE, which claims priority to U.S. Provisional Patent Application Ser. No. 61/768,751, filed on Feb. 25, 2013, entitled A PLASTIC CASE FOR THE IPAD MINI AND IPAD. IT HAS HANDLES ON THE SIDES, 3 ACCESSORY SHOE AREAS, A TRIPOD MOUNT, AND THE ABILITY TO SCREW ON 37 MM LENSES., which are hereby incorporated by reference in their entireties.

BACKGROUND

1. Field

This disclosure generally relates to the field of image capture. More particularly, the disclosure relates to a stabilization configuration for a receptacle for an image capture computing device.

2. General Background

Standard cameras typically allow for utilization of a tripod. For example, a photographer can place a standard camera on a tripod so that movement of the camera during image capture is minimized. The tripod allows a photographer using a standard camera to take pictures without using both hands to stabilize the camera.

Current mobile computing devices, e.g., tablet devices, smartphones, etc., provide image capture capabilities, e.g., still or motion, that are comparable with standard image capture devices such as standard cameras. Yet the picture quality from such mobile computing devices is often of a lesser quality than that of standard cameras as standard cameras provide users with firmer stabilization abilities than a mobile computing device. Users often have difficulty keeping the mobile computing device stable during image capture. The mobile computing device often wobbles during the image capture, which then results in pictures or videos that are often of a less than ideal quality.

Further, many applications utilized by mobile computing devices necessitate a particular orientation for image capture. For instance, many social networking applications configured for utilization by mobile computing devices will only display pictures in a particular format, e.g., a user has to scroll vertically rather than horizontally through pictures. A user has to take pictures in a manner consistent with that format to avoid having to crop the pictures. For example, the user would have to crop pictures taken with a mobile computing device horizontally for an application that displays those pictures vertically. The necessity of cropping and/or other image modification techniques may diminish the quality of the captured image.

Although the vertical format is necessary for image capture for many applications, the vertical format provides less stabilization for a user than the horizontal format. A user may have more difficulty stabilizing a mobile computing device vertically rather than horizontally as the vertical configuration has a lesser width for positioning of the hands of the user than the horizontal configuration. As a result, current mobile computing devices provide limited capabilities to photographers.

SUMMARY

In one aspect of the disclosure, an apparatus is provided. The apparatus comprises a receptacle configured to receive a mobile computing device that has an integrated image capture component. Further, the apparatus comprises a first handle having a first handle top portion that is operably connected to the receptacle and a first handle bottom portion that is operably connected to the receptacle. In addition, the apparatus comprises a second handle having a second handle top portion that is operably connected to the receptacle and a second handle bottom portion that is operably connected to the receptacle. The apparatus also comprises a tripod receiver that is operably attached to the first handle. The tripod receiver receives a tripod connector to connect a tripod to the first handle.

In another aspect of the disclosure, an apparatus is provided. The apparatus comprises a receptacle configured to receive a mobile computing device that has an integrated image capture component. Further, the apparatus comprises a handle having a handle top portion that is operably connected to the receptacle and a handle bottom portion that is operably connected to the receptacle. In addition, the apparatus comprises a stabilization device receiver that is operably attached to the handle, the stabilization device receiver receiving a stabilization device connector to connect a stabilization device to the handle.

In yet another aspect of the disclosure, an apparatus is provided. The apparatus comprises a receptacle configured to receive a mobile computing device that has an integrated image capture component. Further, the apparatus comprises a handle having a handle top portion that is operably connected to the receptacle and a handle bottom portion that is operably connected to the receptacle. In addition, the apparatus comprises a stabilization device that is operably attached to the handle.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A receptacle for an image capture computing device and a stabilization device are provided. The image capture computing device is received by the receptacle. A user may then stabilize the receptacle during image capture with a handle mechanism or a stabilization device mechanism. For instance, the receptacle has one or more handles that provide for stabilization of the receptacle and the image capture computing device. The user grasps the receptacle and motions the receptacle to a position for image capture. The receptacle also has a stabilization device receiver, e.g., a tripod receiver, located at one of the handles that receives a stabilization device, e.g., a tripod. The user can alternatively utilize the stabilization device during image capture. For example, the user can connect a tripod to a handle of the receptacle. The user can then utilize the tripod as for stabilization during image capture rather than grasping the handles of the receptacle.

If the tripod is attached to a vertical handle of the receptacle, the tripod can provide stabilization for the receptacle when the receptacle is positioned in a vertical position for utilization with a computing device application for image capture that utilizes a vertical format. As a result, the tripod provides an alternative to utilization of the one or more handles for stabilization of the mobile computing device during image capture.

Therefore, users performing image capture have the ability to capture still images and/or video images with stabilization either by grasping one or more handles or by utilizing a stabilization device. In contrast with heavy receptacles that do not have handles, the receptacle for the image capture computing device provides a lightweight configuration that provides stabilization for an image capture computing device.

Further, the receptacle may have additional components that allow the user performing image capture to vary image capture conditions. For example, the receptacle may receive a variety of lenses that may be utilized to vary viewing conditions. Further, various lighting and/or audio equipment may be positioned on the receptacle to vary lighting and/or audio conditions.

Figure 1:
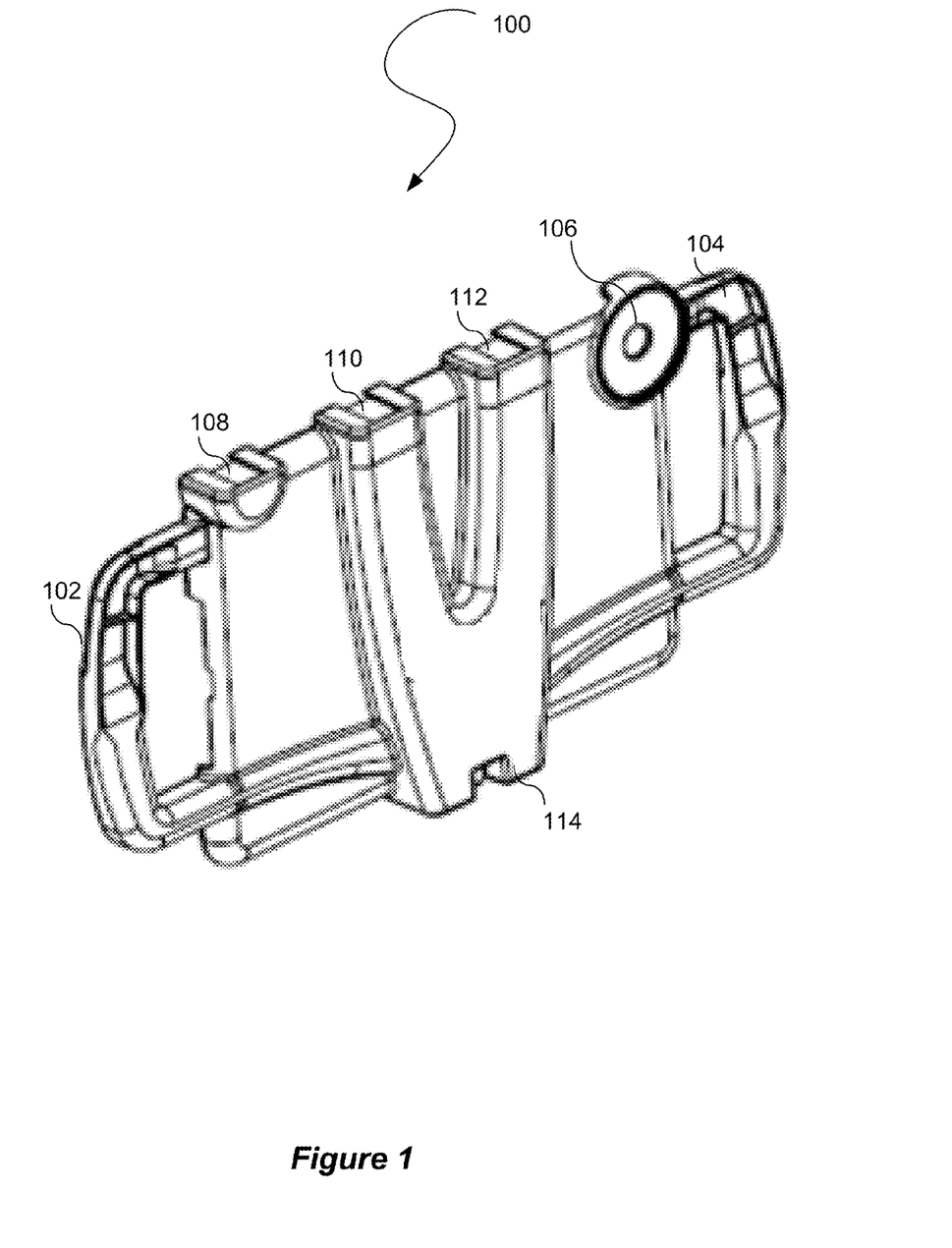
FIG. 1 illustrates a front view of an image capture computing device receptacle.

FIG. 1 illustrates a front view of an image capture computing device receptacle 100. In one embodiment, the image capture computing device 100 includes a plurality of handles, e.g., a right handle 102 and a left handle 104. The front of the image capture computing device receptacle 100 is illustrated from the perspective of what another user views if in front of the image capture computing device 100 when an image is captured by a user such as a photographer. The right handle 102 and the left handle 104 allow the user to perform image capture with minimal wobbling. As a result, the photographer is able to perform image capture with more stabilization and accuracy than without the image capture computing device receptacle 100. Although the right handle 102 and the left handle 104 are illustrated, the handles may be in other locations, e.g., a top handle and a bottom handle. Further, a single handle or more than two handles may be utilized. The right handle 102 and the left handle 104 are provided merely for illustrative purposes.

The image capture computing device receptacle 100 also has an aperture 106. The aperture 106 is configured so that an image capture component, e.g., a lens of a mobile image capture computing device, may be positioned to capture images through the aperture 106. In one embodiment, the aperture 106 is configured to be in substantial proximity to the image capture component. For example, the aperture may be narrow enough to only be positioned over the lens to minimize reflection.

In another embodiment, the image capture computing device receptacle 100 has a plurality of accessory receiving means. As an example, the image capture computing device receptacle 100 has a receiving means 108, a receiving means 110, a receiving means 112, and a receiving means 114. The various receiving means may be utilized to receive accessories such as lighting devices, e.g., lamps, audio devices, e.g., microphones, additional lenses, e.g., wide angle lenses, tripods, and/or the like. For example, the receiving means 114 may receive a tripod mount to provide further stabilization for the image capture computing device receptacle 100 with a tripod. A single or different quantity of receiving means may be utilized from that illustrated in FIG. 1.

In one embodiment, the right handle 102 and the left handle 104 are integrated within the same frame as the image capture computing device receptacle 100. In other words, a single molding may be utilized for the frame and the handles. In an alternative embodiment, the right handle 102 and the left handle are detachable from the frame.

Figure 2:
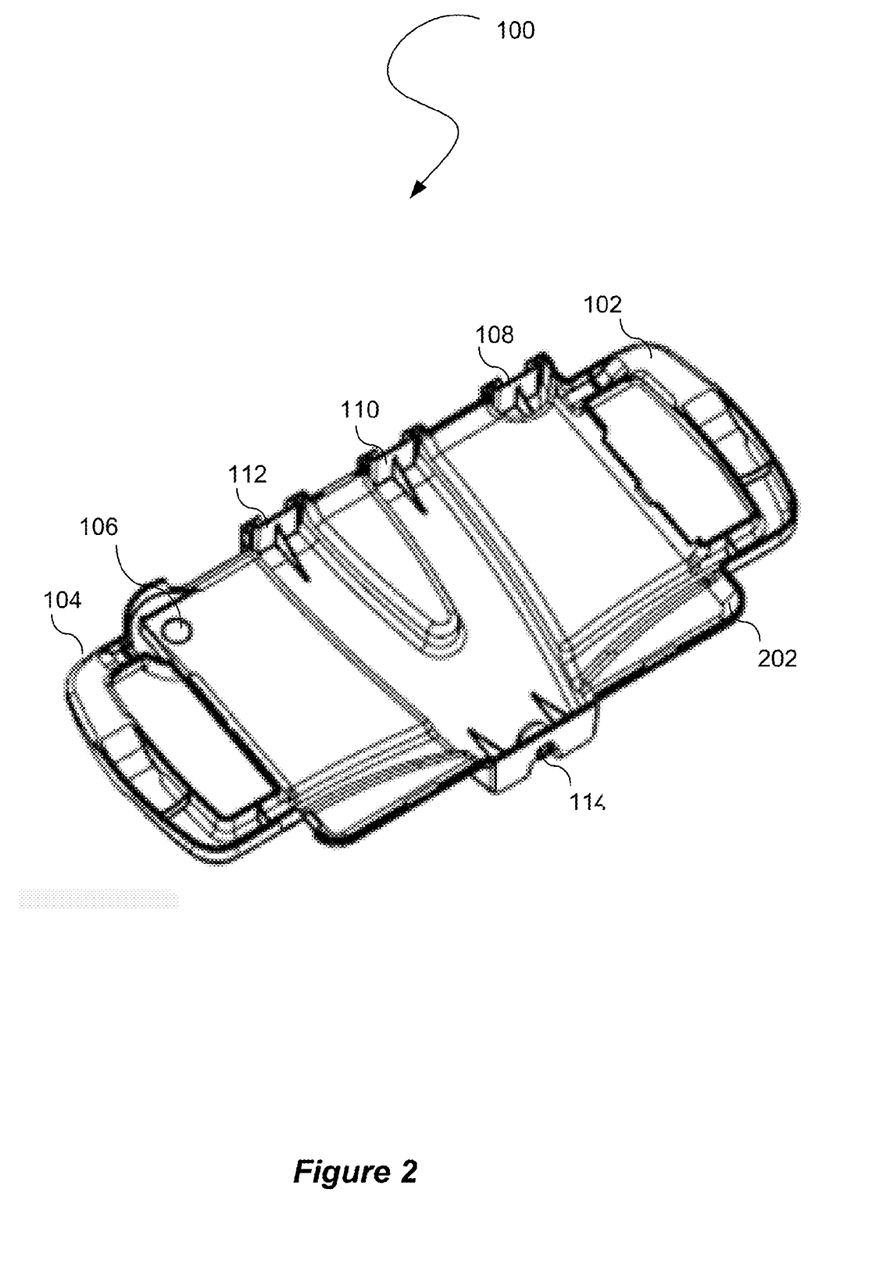
FIG. 2 illustrates a back view of the image capture computing device receptacle.

FIG. 2 illustrates a back view of the image capture computing device receptacle 100. The back view is from the perspective of the photographer that is placing the mobile computing device in the image capture computing device receptacle 100. In one embodiment, the image capture computing device receptacle 100 has a receiving means for receiving the image capture computing device receptacle 100. An example of the receiving means is the lip 202. The lip 202 may be positioned throughout all of the frame or at least a portion of the frame. A photographer may then snap the mobile computing device within the lip to secure the mobile computing device in the image capture computing device receptacle 100. As a result, the photographer may easily snap the mobile computing device into position. The lip is only an example of the receiving means. The receiving means may also be a fastening means such as a screw, bolt, nail, clip, and/or the like.

Figure 3:
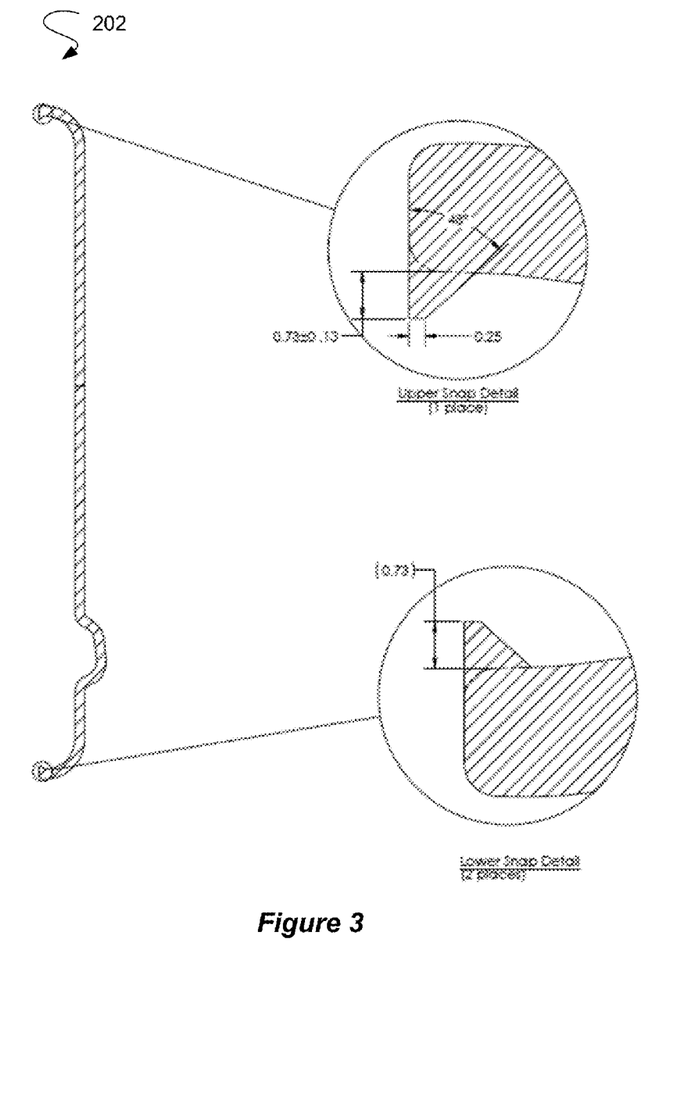
FIG. 3 illustrates a side view of the receiving means.

FIG. 3 illustrates a side view of the receiving means 202. The receiving means 202 is illustrated as a lip only for illustrative purposes as various other receiving means may be utilized.

Figure 4:
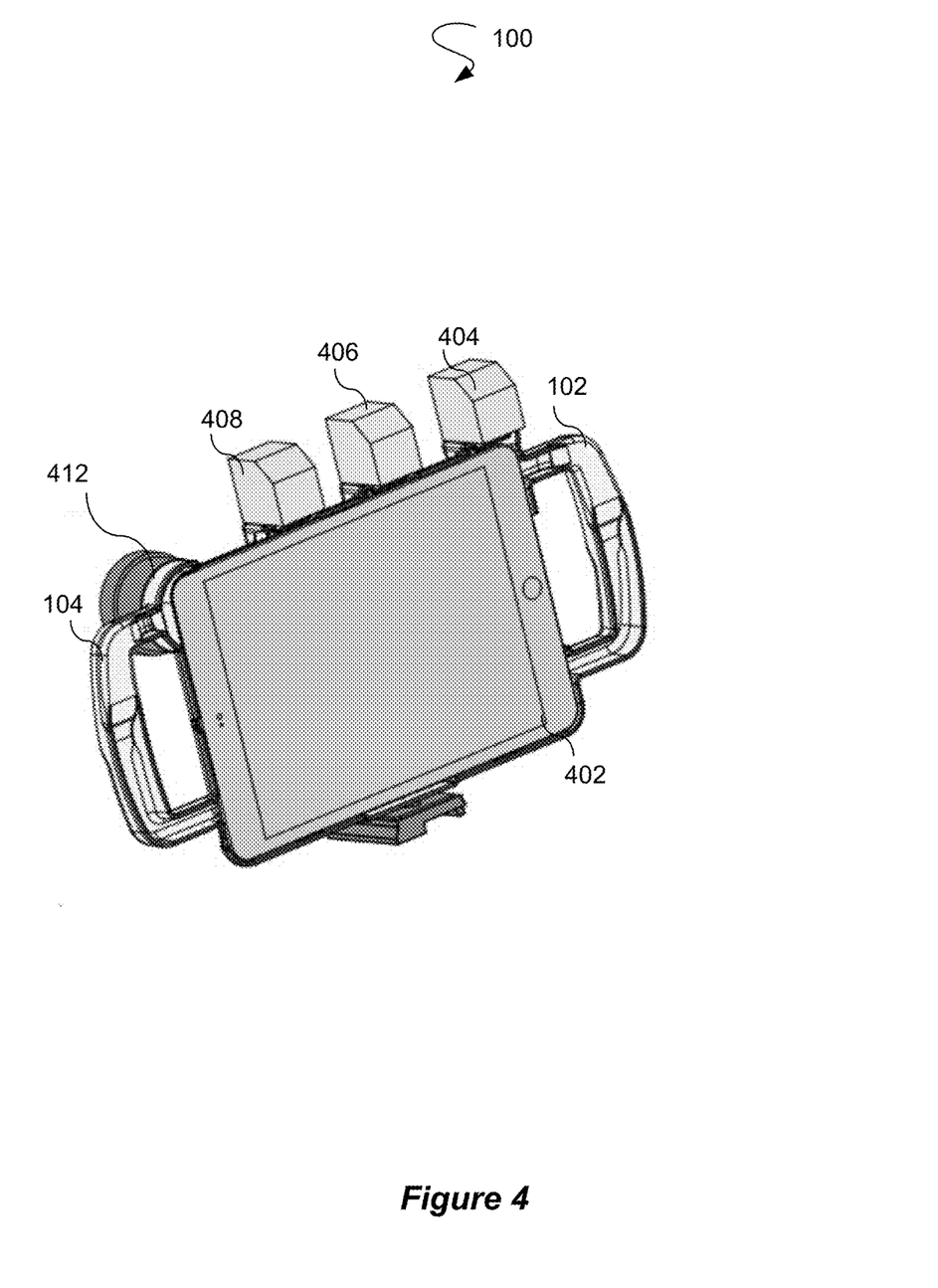
FIG. 4 illustrates a front view of the image capture computing device receptacle with a mobile computing device secured to the image capture computing device receptacle.

FIG. 4 illustrates a front view of the image capture computing device receptacle 100 with a mobile computing device 402 secured to the image capture computing device receptacle 100. The mobile computing device 402 may be a tablet device, smartphone, or any other mobile device. Further, the mobile computing device 402 may have an image capture component, e.g., a built in camera, for still or motion image capture. Various accessories 404, 406, and 408 may be connected to the receiving means 108, 110, and 112. The receiving means 108, 110, and 112 may be a lip, screw, bolt, nail, clip, and/or the like. Further, a lens accessory 412 is positioned over the aperture 106.

Although a frame single frame is illustrated in FIG. 4, multiple frames may alternatively be utilized to secure the mobile computing device 402. In other words, the image capture computing device receptacle 100 may comprise multiple parts such as a front portion and a back portion to secure the mobile computing device 402 to the image capture computing device receptacle 100. Accordingly, the image capture computing device receptacle 100 is not limited to a single frame as multiple frames may alternatively be utilized.

Figure 5:
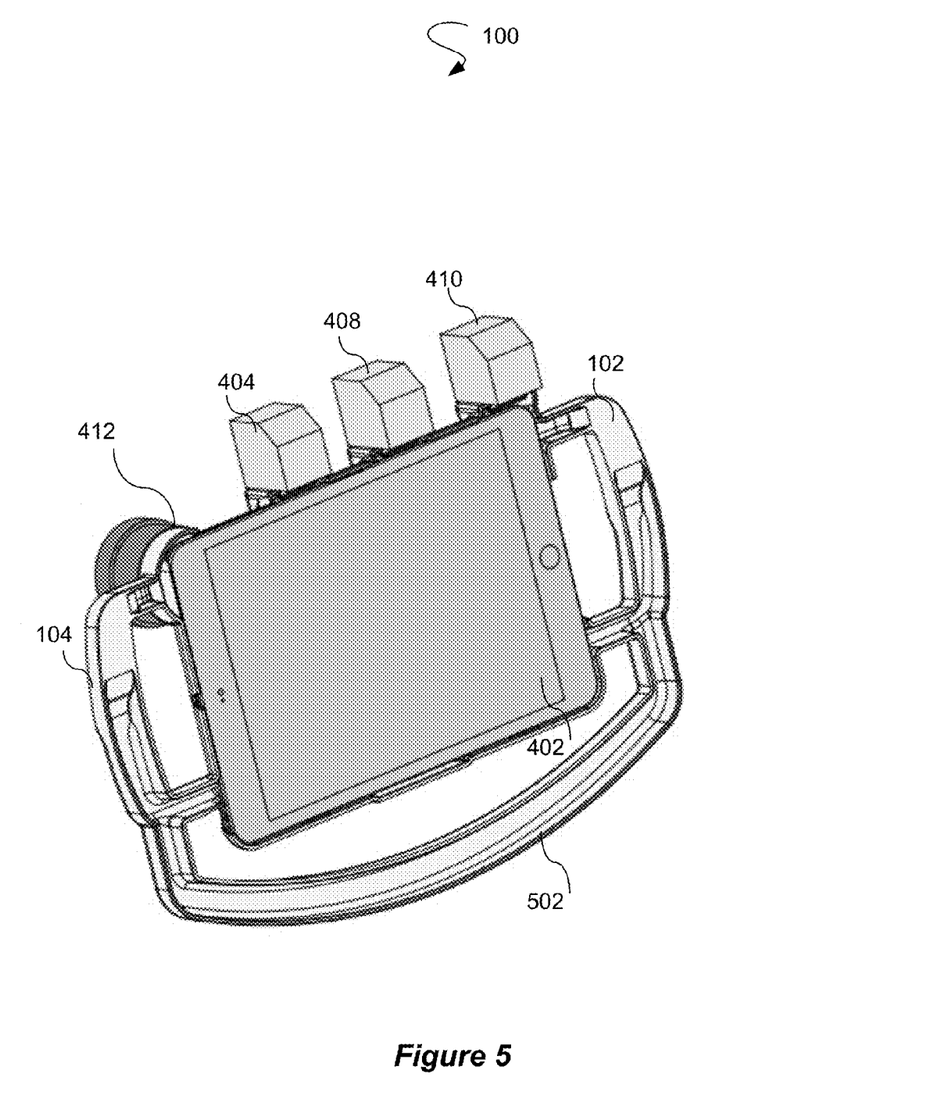
FIG. 5 illustrates a front view of the image capture computing device receptacle 100 with the mobile computing device secured to the image capture computing device receptacle and the image capture computing device receptacle having a bottom handle.

Although FIGS. 1-4 illustrated two handles, a single handle or more than two handles may be utilized. FIG. 5 illustrates a front view of the image capture computing device receptacle 100 with the mobile computing device 402 secured to the image capture computing device receptacle 100 and the image capture computing device receptacle 100 having a bottom handle 502. Alternatively, the right handle 102, the left handle 104, and the bottom handle 502 may be considered a single handle. Further, FIG. 6 illustrates a front view of the image capture computing device receptacle 100 with the mobile computing device 402 secured to the image capture computing device receptacle 100 and the image capture computing device receptacle 100 only having the left handle 104 for a handle.

Figure 6:
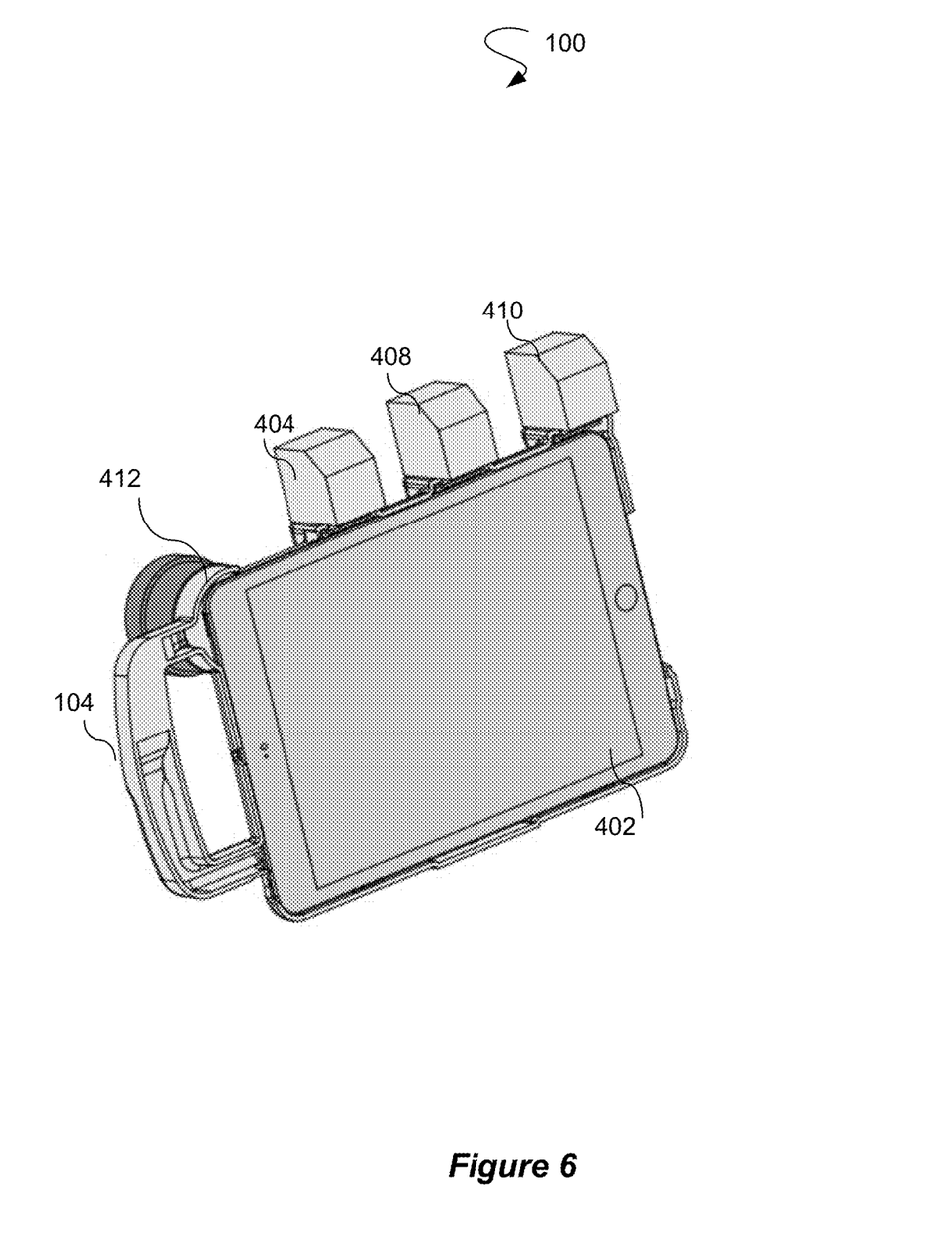
FIG. 6 illustrates a front view of the image capture computing device receptacle with the mobile computing device secured to the image capture computing device receptacle and the image capture computing device receptacle only having the right handle for a handle.
Figure 7:
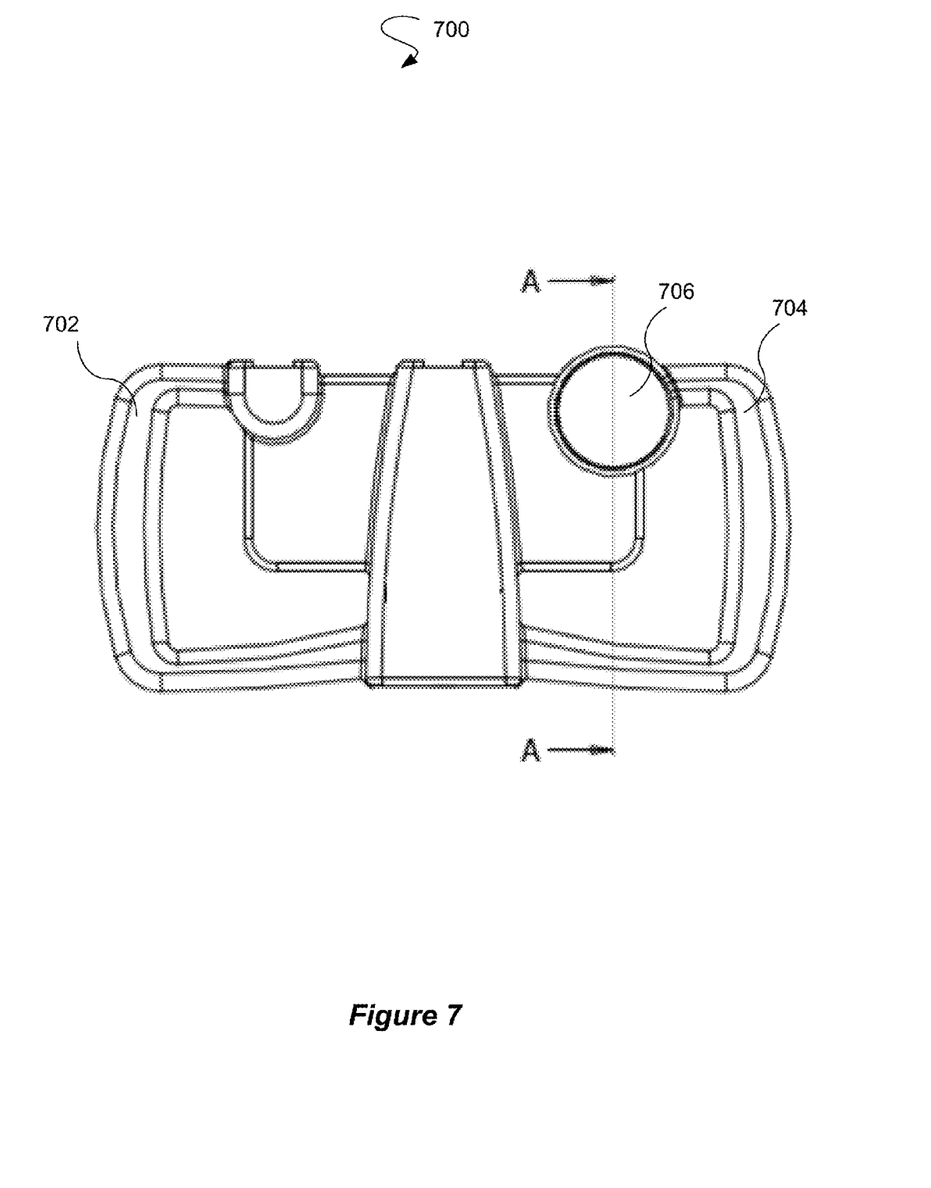
FIG. 7 illustrates a front view of an image capture computing device receptacle that is configured to receive a smartphone.
Figure 8:
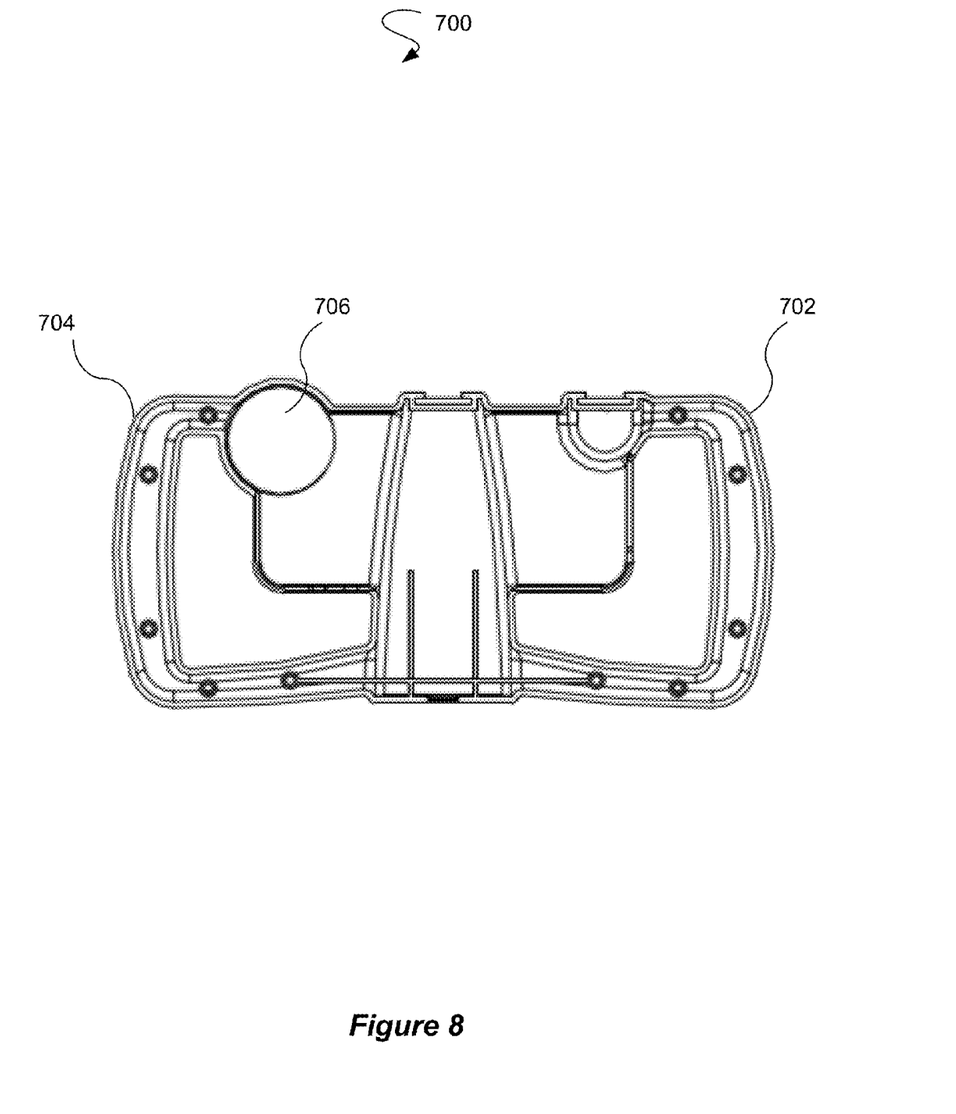
FIG. 8 illustrates a back view of the image capture computing device receptacle illustrated in FIG. 7.

Although FIGS. 4-6 illustrate the mobile computing device 402 as a tablet device, a smartphone may alternatively be utilized. Accordingly, FIG. 7 illustrates a front view of an image capture computing device receptacle 700 that is configured to receive a smartphone. The image capture computing device receptacle 700 has a right handle 702 and a left handle 704. The image capture computing device receptacle 700 also has an aperture 706. FIG. 8 illustrates a back view of the image capture computing device receptacle 700 illustrated in FIG. 7.

Figure 9:
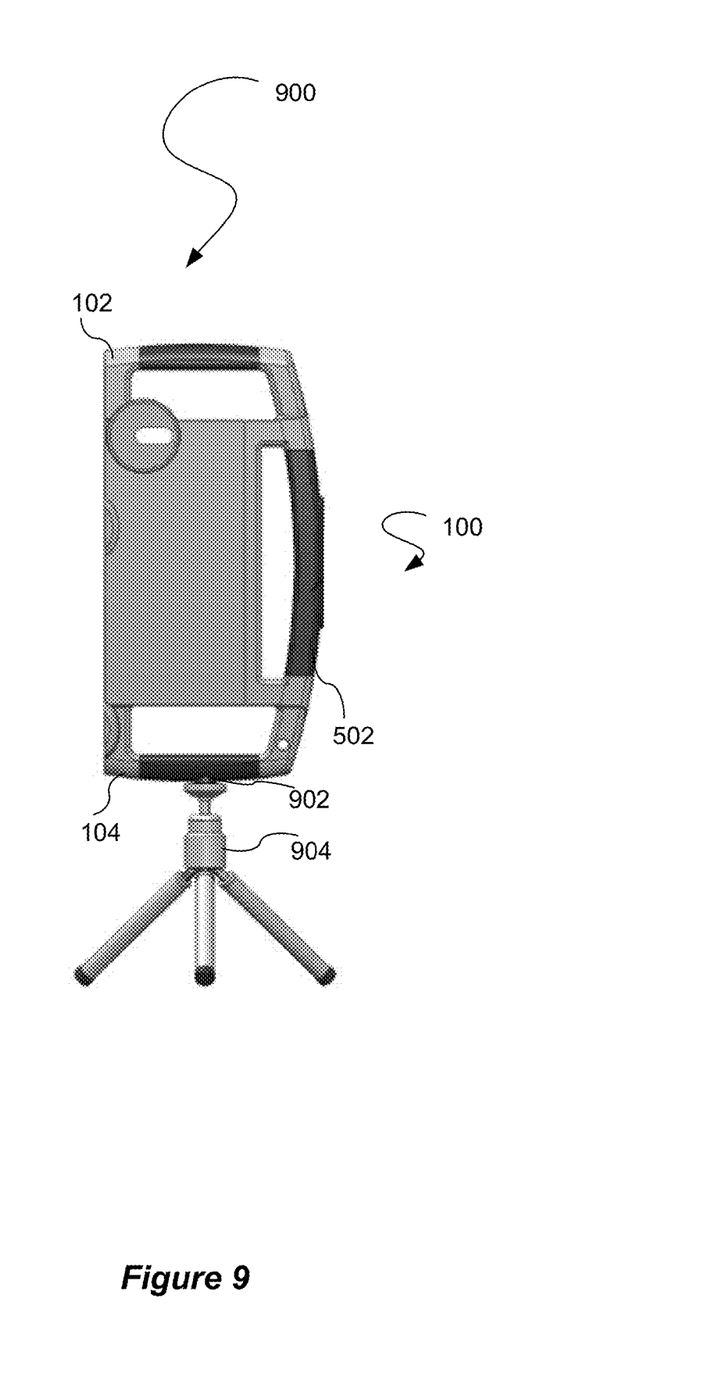
FIG. 9 illustrates a back view of an image capture computing device and stabilization device configuration.

FIG. 9 illustrates a back view of an image capture computing device and stabilization device configuration 900. The image capture computing device and stabilization device configuration 900 has the image capture computing device receptacle 100 with the mobile computing device 402 secured to the image capture computing device receptacle 100 and the image capture computing device receptacle 100 having the right handle 102, the left handle 104, and a bottom handle 502. The image capture computing device and stabilization device configuration 900 also has a stabilization device receiver 902, e.g., a tripod mount, that is operably attached to the left handle 104 and receives a stabilization device 904, e.g., a tripod, a support stand, etc. In one embodiment, the stabilization device receiver 902 may connect to the stabilization device 904 via a connection mechanism such as a screw, clip, or other type of fastening mechanism. In other words, the stabilization device 904 may be attached and detached from the stabilization device receiver 902. In another embodiment, the stabilization device receiver 902 and the stabilization device 904 are not detachable. In other words, the stabilization device 904 is integrated with the image capture computing device receptacle 100.

The image capture computing device receptacle 100 is illustrated in FIG. 9 as being vertically positioned to receive the stabilization device 904 vertically. For instance, a user that wants to take pictures for display on a social networking application that is configured for vertical display can take pictures with use of the stabilization device 904. Although the stabilization device 904 is illustrated in FIG. 9 as being connected to the right handle 902, the stabilization device 904 may alternatively be connected to the left handle 904 via a stabilization device receiver 902 in the left handle 904.

The stabilization device receiver 902 is illustrated in FIG. 9 as being positioned toward the center of the left handle 104. Such positioning allows the image capture computing device receptacle 100 to remain in a balanced position during image capture. Alternatively, the stabilization device receiver 902 illustrated in FIG. 9 may be positioned toward the right of center or left of center of the left handle 104. For instance, the stabilization device 904 may have enough weight and durability to stabilize the image capture computing device receptacle 100 even if the stabilization device receiver 902 is not positioned at the center of the left handle 104.

Figure 10:
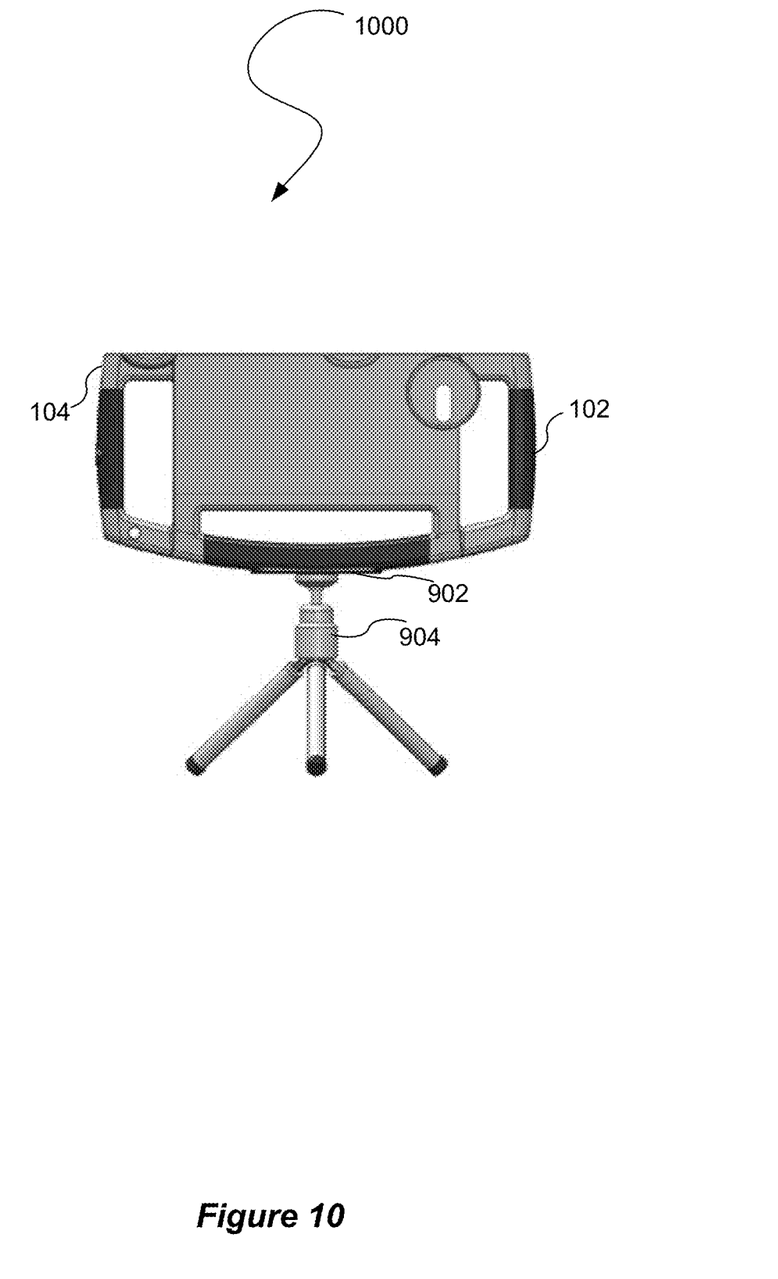
FIG. 10 illustrate an alternative configuration to that of the image capture computing device and stabilization device configuration illustrated in FIG. 9.

FIG. 10 illustrate an alternative configuration 1000 to that of the image capture computing device and stabilization device configuration 900 illustrated in FIG. 9. The alternative configuration 1000 has a stabilization device receiver 902 in the bottom handle 502. The stabilization device receiver 902 is horizontally positioned to receive the stabilization device 904 horizontally. For instance, a user that wants to take pictures for display on a social networking application that is configured for horizontal display can take pictures with use of the stabilization device 904.

The stabilization device receiver 902 is illustrated in FIG. 10 as being positioned toward the center of the bottom handle 502. Such positioning allows the image capture computing device receptacle 100 to remain in a balanced position during image capture. Alternatively, the stabilization device receiver 902 illustrated in FIG. 10 may be positioned toward the right of center or left of center of the bottom handle 502. For instance, the stabilization device 904 may have enough weight and durability to stabilize the image capture computing device receptacle 100 even if the stabilization device receiver 902 is not positioned at the center of the bottom handle 502.

Although the bottom handle 502 is illustrated in FIGS. 9 and 10, a top handle may be utilized for receiving the stabilization device 904 via a stabilization device receiver 902. Further, a single handle that surrounds all or a portion of the image capture computing device receptacle 100 may be utilized for receiving the stabilization device 904 via a stabilization device receiver 902. The quantities of handles that may be utilized are not limited to those illustrated in FIGS. 1-10.

A variety of types of materials may be utilized for the image capture computing device receptacles. For example, plastic, carbonite, metal, or the like may be utilized.

It is understood that the apparatuses described herein may also be applied in other types of apparatuses. Those skilled in the art will appreciate that the various adaptations and modifications of the embodiments of the apparatuses described herein may be configured without departing from the scope and spirit of the apparatuses. Therefore, it is to be understood that, within the scope of the appended claims, the present apparatuses may be practiced other than as specifically described herein.

We claim:

1. An apparatus comprising:
 a receptacle configured to receive a mobile computing device that has an integrated image capture component, the receptacle comprising an aperture configured such that the integrated image capture component is positioned to capture images through the aperture, the receptacle further comprising a geometrical shape portion that surrounds the aperture;
 a first handle having a first handle top portion that is operably connected to the receptacle, a first handle bottom portion that is operably connected to the receptacle, and a first handle central portion that externally extends a distance from an external perimeter of the receptacle without connection to the external perimeter of the receptacle;

a second handle having a second handle top portion that is operably connected to the receptacle and a second handle bottom portion that is operably connected to the receptacle, the second handle being operably connected to the geometrical shape portion; and a tripod receiver that is operably attached to the first handle central portion, the tripod receiver receiving a tripod connector to connect a tripod to the first handle central portion.

2. The apparatus of claim 1, wherein the tripod receiver is positioned toward a center portion of the first handle.

3. The apparatus of claim 1, wherein the tripod receiver is positioned toward a portion of the first handle other than a center portion.

4. The apparatus of claim 1, further comprising a frame that comprises the receptacle, the first handle, and the second handle.

5. The apparatus of claim 1, wherein each of the first handle and the second handle is detachable from the receptacle.

6. The apparatus of claim 1, wherein the first handle comprises a left handle and the second handle comprises a right handle.

7. The apparatus of claim 1, wherein the receptacle has an aperture through which a lens of the image capture component is positioned.

8. An apparatus comprising:
a receptacle configured to receive a mobile computing device that has an integrated image capture component, the receptacle comprising an aperture configured such that the integrated image capture component is positioned to capture images through the aperture, the receptacle further comprising a geometrical shape portion that surrounds the aperture;

a handle having a handle top portion that is operably connected to the receptacle, a handle bottom portion that is operably connected to the receptacle, and a handle central portion that externally extends a distance from an external perimeter of the receptacle without connection to the external perimeter of the receptacle, the handle being operably connected to the geometrical shape portion; and a tripod receiver that is operably attached to the receptacle, the tripod receiver receiving a tripod connector to connect a tripod to the receptacle.

9. The apparatus of claim 8, further comprising a frame that comprises the receptacle and the handle.

10. An apparatus comprising:
a receptacle configured to receive a mobile computing device that has an integrated image capture component, the receptacle comprising an aperture configured such that the integrated image capture component is positioned to capture images through the aperture, the receptacle further comprising a geometrical shape portion that surrounds the aperture;

a handle having a handle top portion that is operably connected to the receptacle, a handle bottom portion that is operably connected to the receptacle, and a handle central portion that externally extends a distance from an external perimeter of the receptacle without connection to the external perimeter of the receptacle, the handle being operably connected to the geometrical shape portion; and a tripod that is operably attached to the receptacle.

11. The apparatus of claim 8, further comprising a frame that comprises the receptacle and the handle.

* * * * *